(12) United States Patent
Hayashi et al.

(10) Patent No.: US 6,453,887 B1
(45) Date of Patent: Sep. 24, 2002

(54) FUEL VAPOR EMISSION CONTROL DEVICE FOR AN ENGINE

(75) Inventors: Takane Hayashi; Takeshi Tsuyuki; Shigeaki Kakizaki; Masato Kobayashi, all of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/087,762

(22) Filed: Mar. 5, 2002

(30) Foreign Application Priority Data

Mar. 14, 2001 (JP) ........................... 2001-071562
Mar. 14, 2001 (JP) ........................... 2001-071564

(51) Int. Cl.$^7$ .............................................. F03M 37/04
(52) U.S. Cl. ........................................ 123/520; 123/357
(58) Field of Search .................... 123/520, 521, 123/518, 519, 516, 198 D, 357, 674

(56) References Cited

U.S. PATENT DOCUMENTS

| 5,216,997 | A | * | 6/1993 | Osanai et al. | 123/698 |
| 5,680,849 | A | * | 10/1997 | Morikawa et al. | 123/520 |
| 5,699,778 | A | * | 12/1997 | Muraguchi et al. | 123/698 |
| 5,988,150 | A | * | 11/1999 | Osanai | 123/698 |
| 6,039,032 | A | * | 3/2000 | Morikawa et al. | 123/520 |
| 6,092,515 | A | * | 7/2000 | Morikawa | 123/698 |
| 6,173,703 | B1 | * | 1/2001 | Matsumoto | 123/674 |
| 6,234,156 | B1 | * | 5/2001 | Muto | 123/698 |

FOREIGN PATENT DOCUMENTS

JP          6-264832          9/1994

OTHER PUBLICATIONS

Edited by Tsukada, Theory of Surfaces II, Maruzen, 1995, pp. 25–27 and 108–115.

* cited by examiner

Primary Examiner—Carl S. Miller
(74) Attorney, Agent, or Firm—Foley & Lardner

(57) ABSTRACT

A fuel vapor emission control device of an engine 10 includes a canister 4 which adsorbs fuel vapor generated in a fuel tank 1, and a purge valve 11 which opens and closes a pipe 6 connecting the canister 4 and an intake passage 8 of the engine 10. A controller 21 sets a target purge rate according to a difference between a target air-fuel ratio feedback deviation and an actual air-fuel ratio feedback deviation during purge, and drives the purge valve 11 so that the target purge rate is achieved.

7 Claims, 14 Drawing Sheets

FUEL VAPOR EMISSION CONTROL DEVICE FOR AN ENGINE

FIELD OF THE INVENTION

This invention relates to a fuel vapor emission control.

BACKGROUND OF THE INVENTION

An engine comprises a fuel vapor emission control device wherein the fuel vapor generated in a fuel tank when the engine has stopped is first adsorbed by activated carbon in a canister, the fuel adsorbed by the activated carbon is desorbed using a manifold vacuum under a predetermined running condition after the engine starts, and the fuel vapor is led into an intake passage downstream of a throttle valve to be burnt.

JP-A-H6-264832 published by the Japanese Patent Office in 1994 discloses a technique wherein, in a fuel vapor emission control device, to perform an effective purge rate setting and maintain a large purge flowrate, the purge rate is set according to an integrated flowrate. The purge rate is the ratio of the purge flowrate and intake air flowrate. Specifically, as the integrated value of the purge flow rate increases, the purge rate is increased.

SUMMARY OF THE INVENTION

However, in this aforesaid prior art, the purge rate relative to the integrated purge flowrate was set to its optimum value in the state where fuel is adsorbed up to the maximum capacity by the canister (full charge state), to prevent oversupply of fuel vapor due to purge. As a result, when the canister is fully charged, the optimum purge rate can be set, but when the adsorption amount of the canister is low, the optimum purge rate cannot be set. In other words, when the canister adsorption amount is small, in the prior art, a small purge rate was set based on the full charge state regardless of the fact that a large purge rate could actually be set in practice. Further, as a fixed purge rate was always set relative to the integrated purge flowrate, it cannot be dealt with when a purge gas of higher concentration than that expected was supplied.

It is therefore an object of this invention to perform a large amount of purge and set an optimum purge rate in a fuel vapor emission control device without worsening the combustion stability of the engine and increasing exhaust gas emissions.

In order to achieve above object, this invention provides a fuel vapor emission control device of an engine which is air-fuel ratio feedback controlled, comprising a canister which adsorbs fuel vapor generated in a fuel tank of the engine, a purge passage which connects the canister and an intake passage of the engine, a purge valve which opens and closes the purge passage, and a controller functioning to compute a target air-fuel ratio feedback deviation, which is the deviation between a target value of the air-fuel ratio feedback correction coefficient and a basic value of the air-fuel ratio feedback correction coefficient, compute an actual air-fuel ratio feedback deviation which is the deviation between an actual air-fuel ratio feedback correction coefficient and the basic value of the air-fuel ratio feedback correction coefficient, set a target purge rate according to the difference between the target air-fuel ratio feedback deviation and the actual air-fuel ratio feedback deviation, and drive the purge valve so that the purge rate becomes the target purge rate.

The details as well as other features and advantages of this invention are set forth in the remainder of the specification and are shown in the accompanying drawings.

DESCRIPTION OF THE PREFERRED EMBODIMENTS

Figure 1:
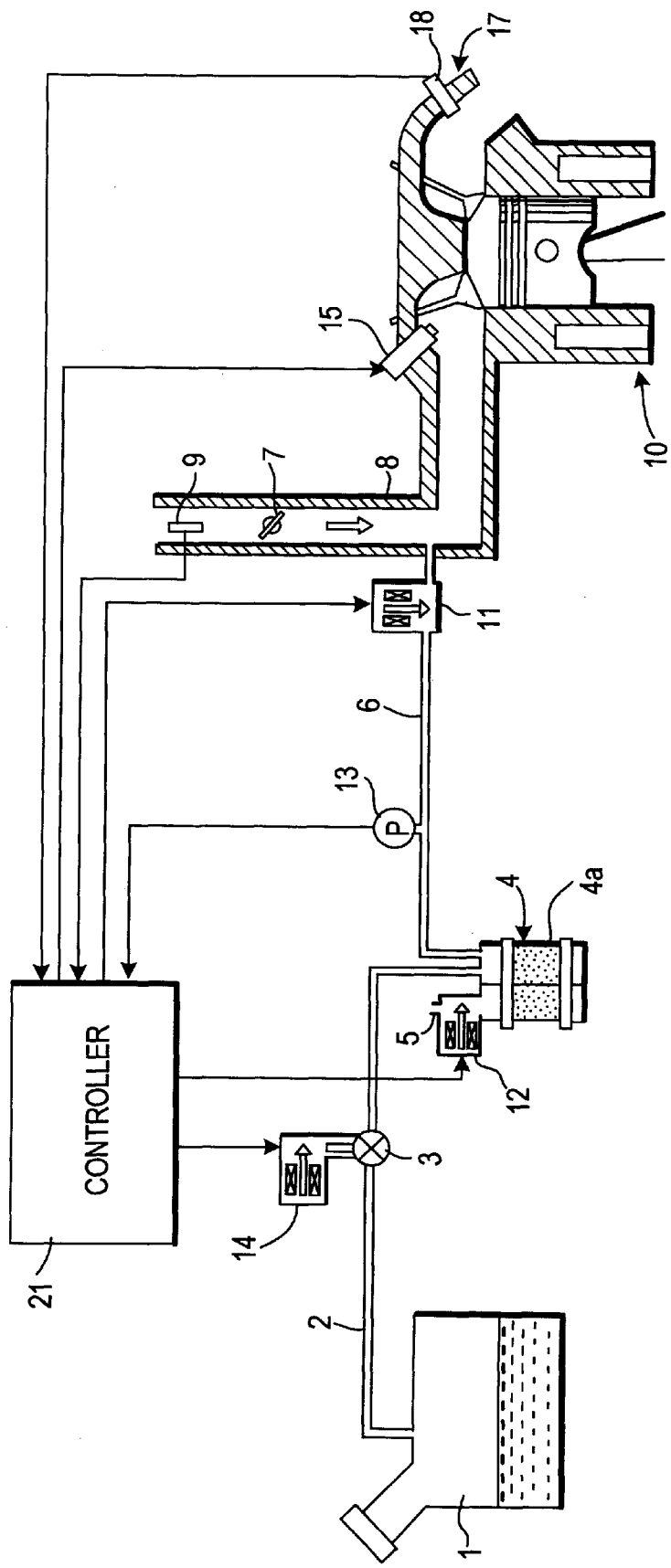
FIG. 1 is an overall schematic diagram of a fuel vapor emission control device.

Referring to FIG. 1 of the drawings, a fuel vapor emission control device of an engine 10, comprises a canister 4, a pipe 2 which connects the canister 4 to a fuel tank 1, and a pipe 6 (purge passage) which connects the canister 4 to an intake passage 8 downstream of a throttle valve 7, and processes fuel vapor generated in the fuel tank 1.

A vacuum cut valve 3 which opens when the pressure in the fuel tank 1 drops below atmospheric and a bypass valve 14 are provided in parallel in the pipe 2. A purge valve 11 which opens when fuel adsorbed by a fuel adsorbent (activated carbon) 4a in the canister 4 is desorbed, and a pressure sensor 13 which measures the pressure in the pipe 6, are provided in the pipe 6. The canister 4 has an air port 5. The air port 5 is opened and closed by a drain cut valve 12.

Fuel vapor generated in the fuel tank 1 is led to the canister 4 via the pipe 2, the fuel component alone is adsorbed by the activated carbon 4a in the canister 4, and the remaining air is discharged to the outside via the air port 5. To process the fuel adsorbed by the activated carbon 4a, the purge valve 11 is opened, and air is drawn into the canister 4 from the air port 5 making use of the manifold vacuum which develops downstream of the throttle valve 7. In this way, the fuel which was adsorbed by the activated carbon 4a is desorbed by air, and is introduced to the intake passage 8 of the engine 10 together with the air via the pipe 6 (referred to as purge control).

A controller 21 drives fuel injectors 15 with a pulse width corresponding to the fuel amount required to realize the target air-fuel ratio (usually, the stoichiometric air-fuel ratio) according to the intake air amount detected by an air flowmeter 9. At this time, the controller 21 detects the air-fuel ratio after combustion by an oxygen sensor 18 attached to an exhaust passage 17, and corrects the fuel injection amount according to the deviation from the target air-fuel ratio (hereafter, referred to as air-fuel ratio feedback control). In this air-fuel ratio feedback control, the deviation between the target air-fuel ratio and the actual air-fuel ratio detected by the oxygen sensor 18 is reflected in an air-fuel ratio feedback correction coefficient α.

During purge control, the controller 21 maintains the combustion stability of the engine, sets a high target purge rate (ratio of purge flowrate to intake air flowrate) as far as possible to the extent that exhaust gas emissions are not increased, and drives the purge valve 11 so that the target purge rate is realized. During purge control, fuel and air in the purge gas are supplied to the engine 10, so the controller 21 corrects the fuel injection amount according to the purge rate and purge air-fuel ratio, and suppresses fluctuation of the air-fuel ratio of the engine 10.

Figure 2:
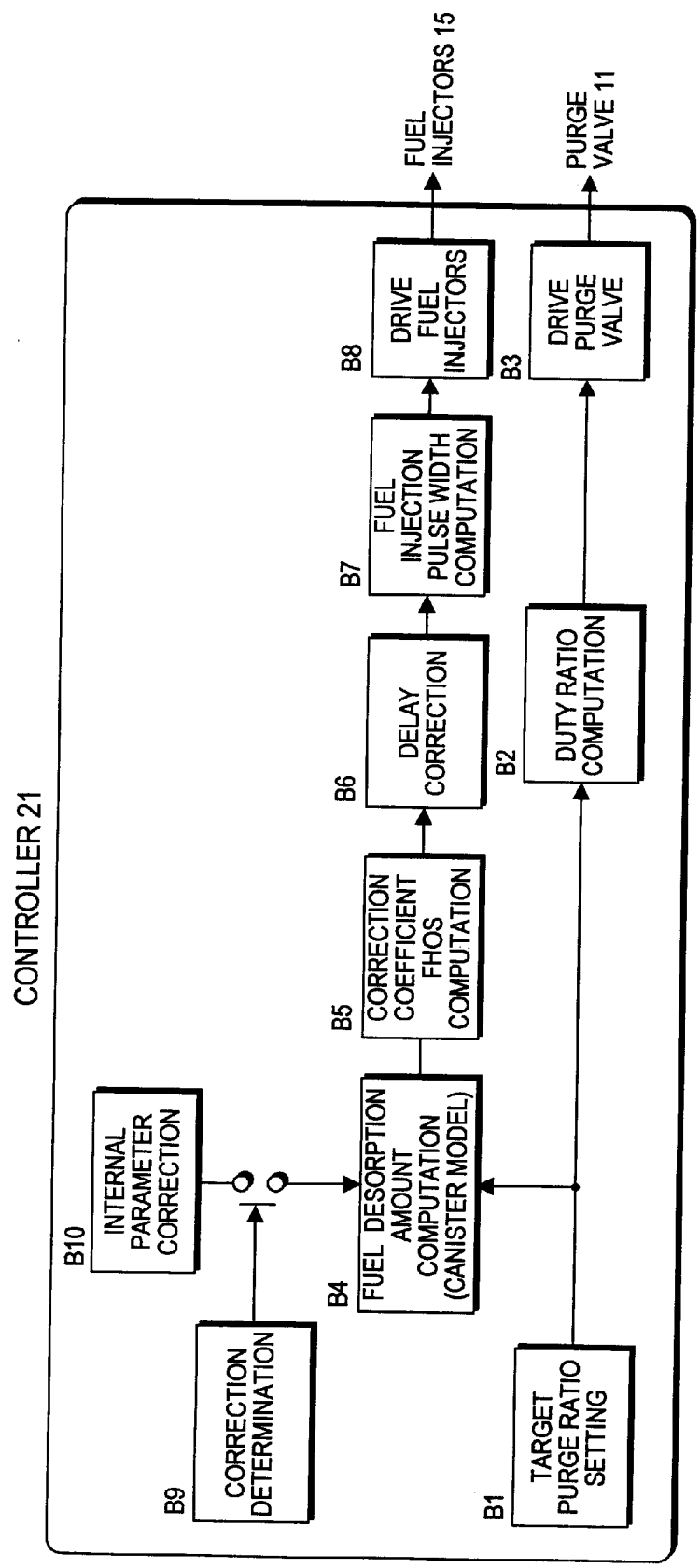
FIG. 2 is a block diagram showing the purge control performed by a controller.

FIG. 2 is a block diagram showing the purge control performed by a controller 21.

Each block will now be described. A block B1 computes a maximum purge rate which can be set in the present running region based on performance characteristics of the parts related to purge control, and sets the target purge rate to follow this maximum purge rate. However, sharp variations of purge rate lead to fluctuation of the air-fuel ratio of the engine 10 and give rise to increased emissions, therefore the variation amount of the purge rate is limited so as not to exceed a predetermined amount (purge rate variation amount limit) so that the purge rate does not vary sharply. A block B2 computes a duty ratio of the purge valve 11 required to realize this target purge rate. A block B3 drives the purge valve 11 at the duty ratio computed by the block B2.

A block B4 computes a fuel amount desorbed from the canister 4 when purge is performed at the above target purge rate using a physical model (hereafter, referred to as a canister model) described later. A block B5 computes a correction coefficient FHOS of the fuel injection pulse width so that the air-fuel ratio fluctuation due to purge is reduced based on the estimated desorption amount. A block B6 performs a delay correction, comprising a dead time correction and a diffusion processing, on the correction coefficient FHOS. A block B7 performs a correction of the fuel injection pulse width set according to the running condition based on the correction coefficient FHOS after the delay correction. A block B8 drives the fuel injectors 15 to perform fuel injection at the fuel injection pulse width after the delay correction.

The canister model represents the desorption characteristics of the canister 4 to a high degree of precision, but as it is an approximate model, values computed by using it (desorption amount, adsorption amount, etc.) deviates to some extent from the actual values. Also, the canister model computes the fuel amount desorbed from the canister 4 using the computation result on the immediately preceding occasion as described later, so the deviation between the computed values and actual values increases as the operating time of the model becomes longer due to the accumulation of the error. Hence, to correct this deviation and maintain a high computational precision of the model, when it is determined by the block B9 that it is possible to perform a correction, the controller 21 corrects the value of the fuel adsorption amount of the canister 4 which is one of the internal parameters of the canister model in a block B10.

Specifically, under the condition where all of the air-fuel ratio fluctuation may be considered to be due to purge, the block B9 determines that it is possible to perform correction processing. The air-fuel ratio fluctuation is absorbed by air-fuel ratio feedback control, and it appears as a fluctuation of the air-fuel ratio feedback correction coefficient α. When it is determined that the correction processing can be performed, the block B10 estimates the amount of fuel desorbed from the canister 4 from the air-fuel ratio fluctuation (fluctuation of the air-fuel ratio feedback correction coefficient α) at that time, and computes the adsorption amount (fuel amount in the canister 4) by inverse computation from the estimated desorption amount. The value of the adsorption amount in the canister model is then corrected by this value.

The specific details of the control performed by the controller 21 will now be described.

Figure 3:
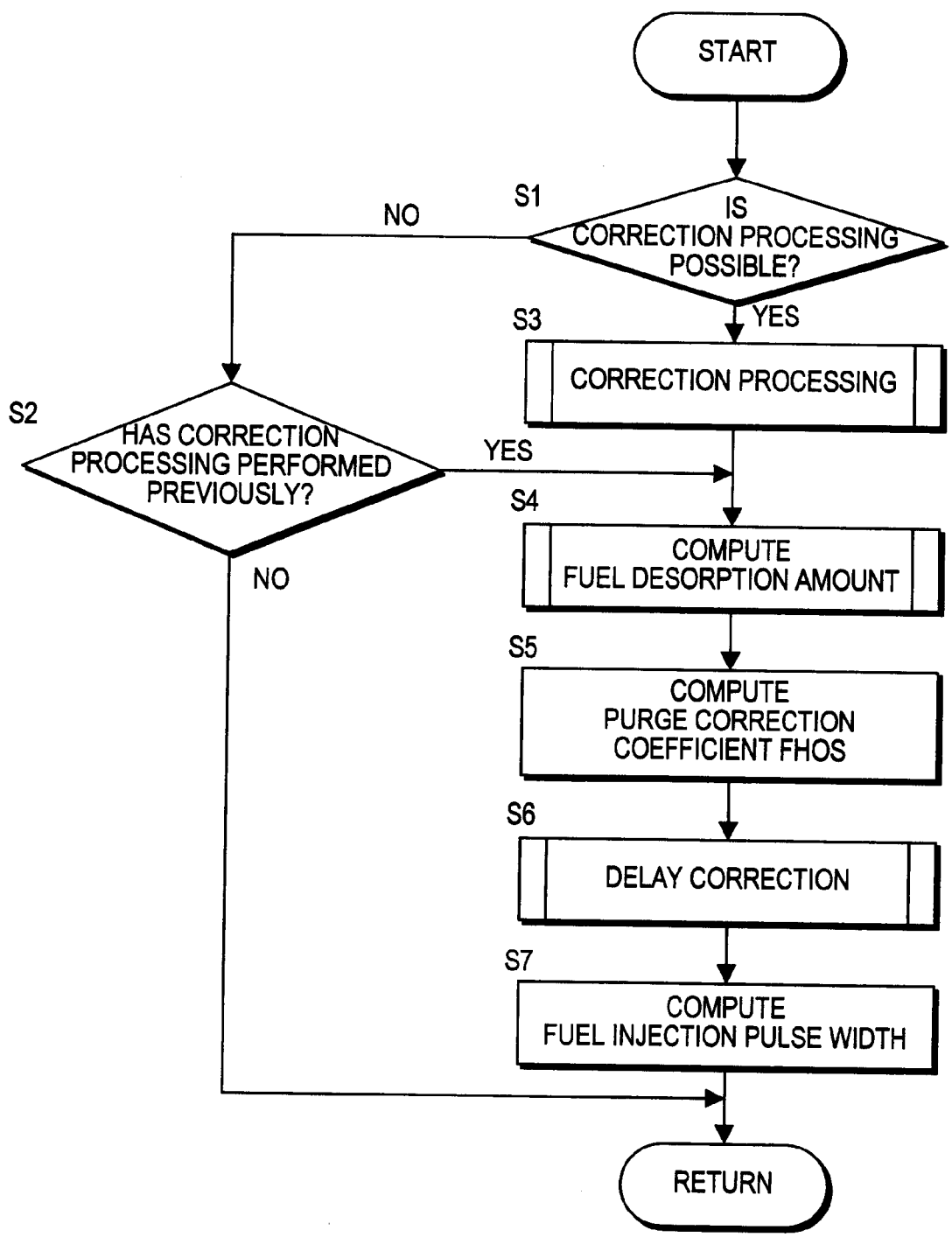
FIG. 3 is a flowchart showing the details of the purge control.

FIG. 3 is a flowchart showing the purge control performed by the controller 21, which is performed repeatedly when purge is performed. In this control, the fuel injection amount (fuel injection pulse width) is corrected according to the fuel amount supplied from the canister 4 to the engine 10 by purge, and air-fuel ratio fluctuation due to purge is suppressed.

In a step S1, it is determined whether it is possible to perform correction of the value of the adsorption amount which is an internal parameter of the canister model. When there is little disturbance of the air-fuel ratio due to factors other than purge, and the effect on the air-fuel ratio feedback correction coefficient α due to purge is relatively large, i.e., when it can be considered that the deviation from the target value of the air-fuel ratio feedback correction coefficient a is effectively due entirely to the effect of purge, it is determined that correction processing can be performed.

Figure 4:
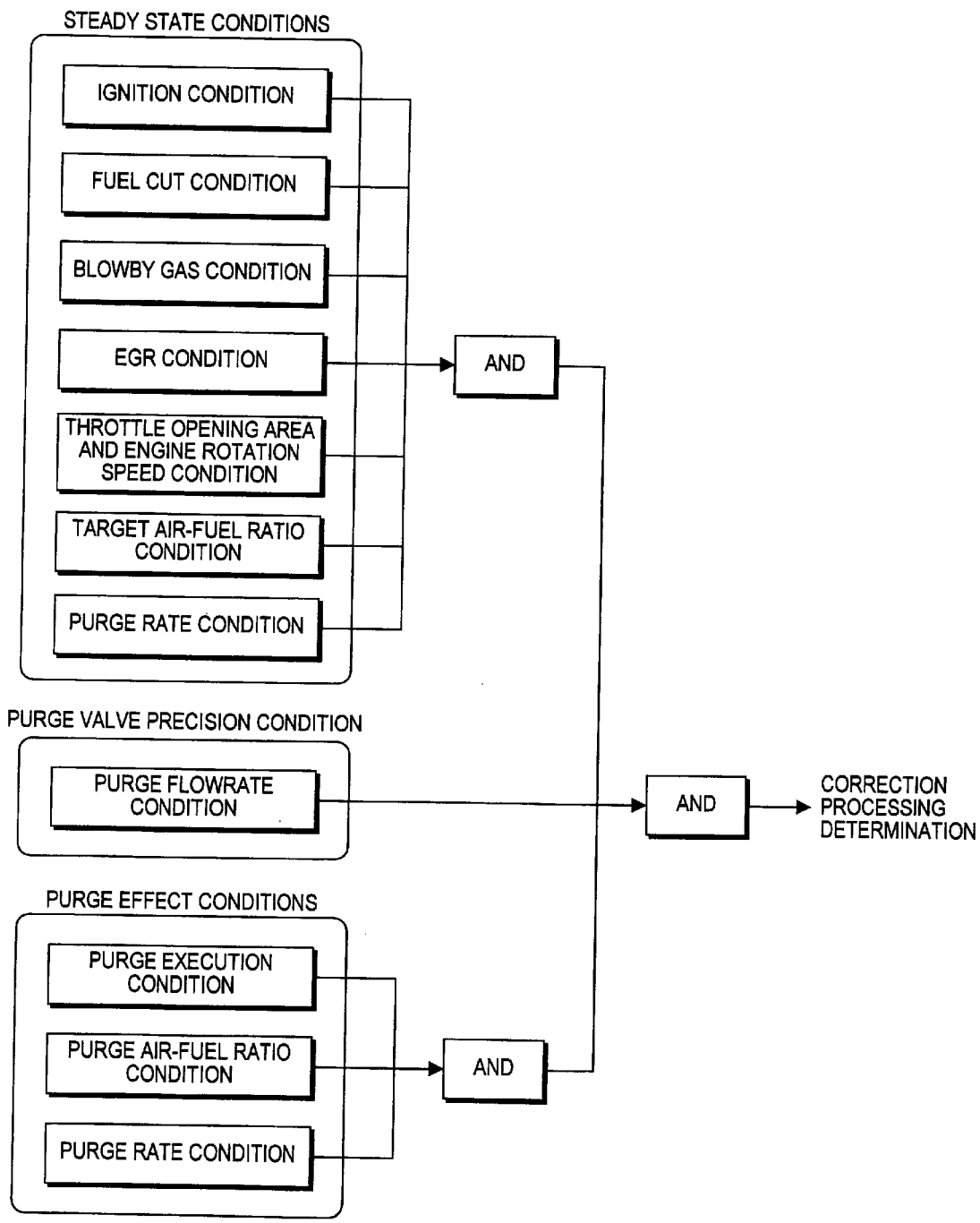
FIG. 4 is a block diagram showing the details of processing which determines whether or not correction processing is possible.

Specifically, when the "steady state conditions", the "purge valve precision condition" and the "purge effect conditions" shown in FIG. 4 are all satisfied, it is determined that correction processing can be performed. When any of these conditions is not satisfied, it is determined that correction processing cannot be performed. This correction processing corresponds to the processing of the block B9 in FIG. 2.

As shown in FIG. 4, the "steady state conditions" are an ignition condition (engine 10 does not misfire), fuel cut condition (engine 10 does not perform fuel cut), blowby gas condition (blowby gas is absent), EGR condition (exhaust gas recirculation rate is constant), throttle opening area and engine rotation speed condition (throttle opening area and engine rotation speed are constant), target air-fuel ratio condition (target air-fuel ratio is constant) and purge rate condition (purge rate is constant). When it is determined that all of these conditions are satisfied and there is little disturbance of the air-fuel ratio except due to purge, it is determined that steady state conditions are satisfied.

As the "purge valve precision condition", a purge flowrate condition (purge flowrate is greater than a predetermined amount) is set. When the purge flowrate is small, the control precision of the purge flowrate falls and the computational precision in the correction processing described later falls, so when the purge flowrate is less than the predetermined amount, it is determined that the purge valve precision condition is not satisfied. The predetermined value may for example be set to 15 L/min.

As the "purge effect conditions", a purge execution condition (purge is being performed), purge air-fuel ratio condition (air-fuel ratio of purge gas is richer than a predetermined air-fuel ratio, e.g., the variation amount of α per 1% of the purge rate is higher than 1%) and a purge rate condition (purge rate is greater than a predetermined value, e.g., the purge rate is higher than 3%. This predetermined value is set so that the variation amount of the air-fuel ratio lies within the target range for the system and the frequency of correction becomes maximum) are set. When it is determined that all these conditions are satisfied and the effect of purge on the air-fuel ratio is relatively large, it is determined that the purge effect conditions are satisfied.

Thus, when it is determined in the step S1 that correction processing can be performed, the routine proceeds to a step S3 and correction processing is performed. In the correction processing, the fuel amount desorbed from the canister 4 is estimated from the variation of the air-fuel ratio feedback correction coefficient α. Also, the fuel amount which was adsorbed by the canister 4 is computed by inverse computation from the estimated desorption amount, and the value of the adsorption amount which is an internal parameter of the canister model is corrected by the value of the adsorption amount calculated by this inverse computation (described in detail later).

On the other hand, when it is determined in the step S1 that correction processing cannot be performed, the routine proceeds to a step S2. In the step S2, it is determined whether or not correction processing has been performed previously. The reason why this determination is performed is because, when correction processing has not even been performed once, the initial value (initial adsorption amount) required to make the canister model function does not yet exist and purge control based on the canister model cannot be performed. If the result of the determination shows that correction processing has previously been performed, even only once, the routine proceeds to a step S4, and if correction processing has not been performed even once, this routine is terminated. However, when correction processing has not been performed even once, it does not mean that purge is not performed. In this case, purge is performed by a purge control (boot-up control shown in FIG. 15) which does not use the canister model, described later.

In the step S4, the fuel desorption amount from the canister 4 is computed using the canister model. Specifically, the amount of fuel desorbed from the canister 4 is computed according to the flowchart shown in FIG. 10 (described in detail later).

In a step S5, a purge correction coefficient FHOS is computed based on the desorption amount and the intake air flowrate. The purge correction coefficient FHOS is computed corresponding to the air-fuel ratio fluctuation (variation of the air-fuel ratio feedback correction coefficient α) predicted from the desorption amount supplied to the engine 10 computed by the canister model. Specifically, for example, when the desorption amount from the canister 4 increases and the fuel amount supplied to the engine 10 increases, the air-fuel ratio of the engine 10 shifts to rich, and it may be expected that if it were attempted to restore this, the air-fuel ratio feedback correction coefficient α would vary to the small side. Hence, the purge correction coefficient FHOS is computed as a small value in order to correspondingly reduce the fuel injection amount in advance. The computed correction coefficient FHOS is sequentially stored in a predetermined data storage area (FIG. 8) of the controller 21.

In a step S6, a delay correction comprising a dead time correction and diffusion processing is applied to the purge correction coefficient FHOS. The reason for the dead time correction is that there is a delay from when the purge valve 11 opens to when the purge gas reaches the cylinders of the engine 10 depending on the displacement velocity of the purge gas and the distance between the purge valve 11 and cylinders of the engine 10. Further, the reason for performing the diffusion processing is that the fuel desorbed from the canister 4 diffuses during its passage to the cylinders of the engine 10.

Figure 5:
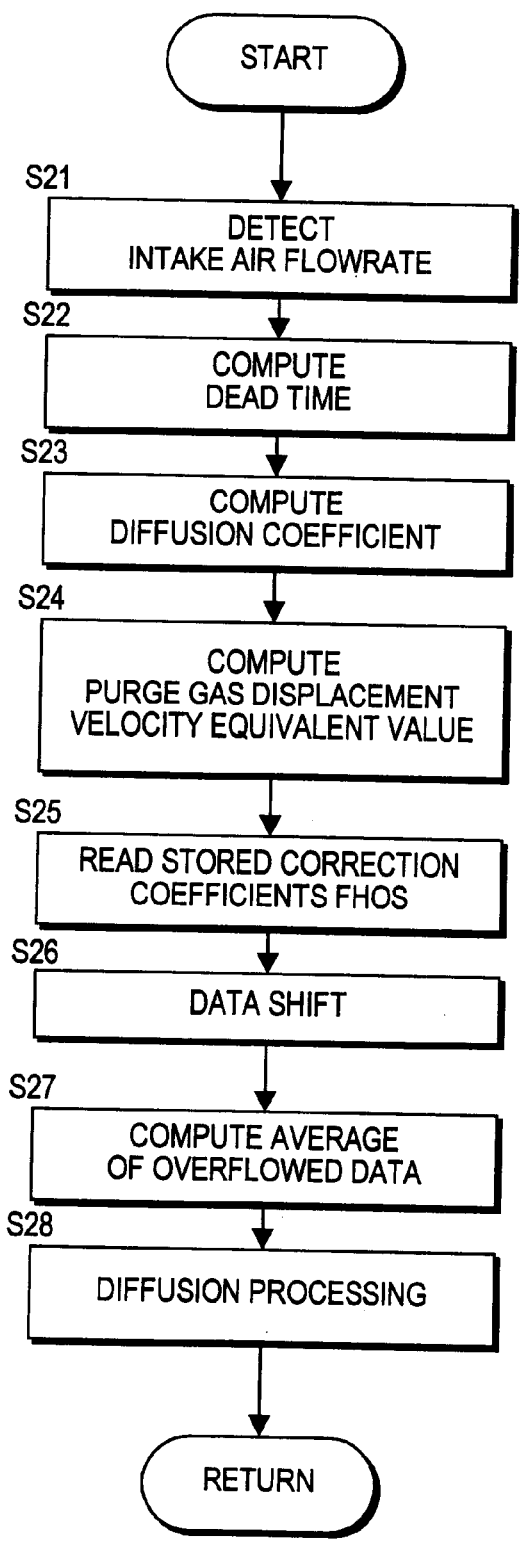
FIG. 5 is a flowchart showing the details of the delay correction.

FIG. 5 is a flowchart showing the details of the delay correction. This corresponds to the processing of the block B6 in FIG. 2.

Figure 6:
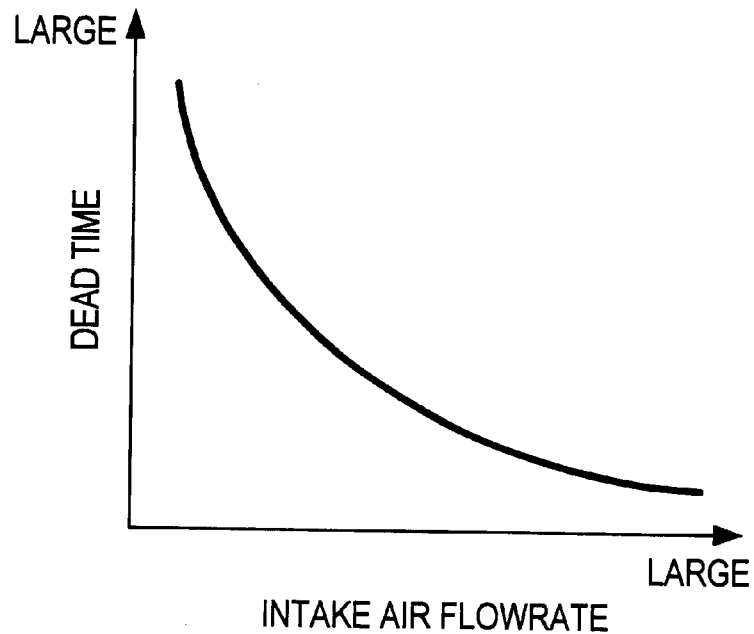
FIG. 6 is a table specifying a relation between an intake air flowrate and a dead time.
Figure 7:
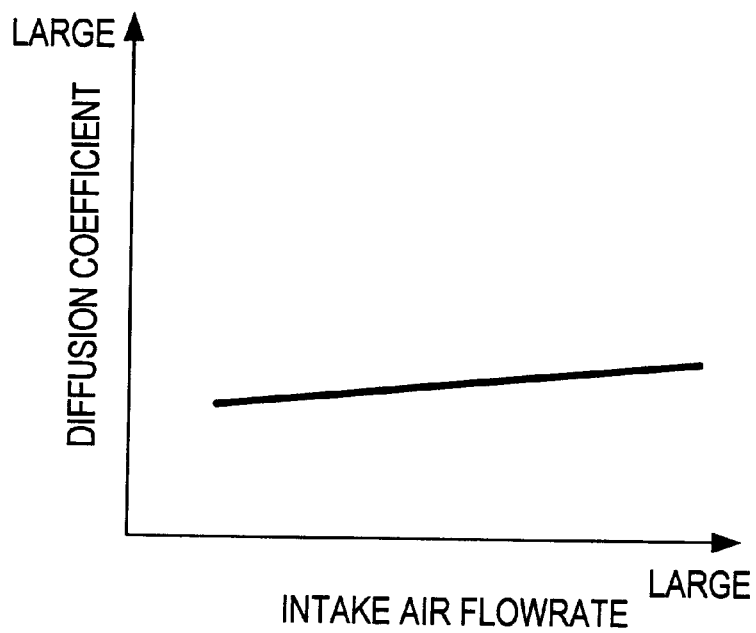
FIG. 7 is a table specifying a relation between the intake air flowrate and a diffusion coefficient.

According to this, firstly, in a step S21, an intake air flowrate is detected from the output of the air flow meter 9. In steps S22, S23, a dead time and a diffusion coefficient are found by looking up tables shown in FIG. 6, FIG. 7 respectively. The intake air flow velocity increases the larger the intake air flowrate, so a small value is set to the dead time. Also, when the intake air flowrate increases and the intake air flow velocity increases, the rate at which the desorbed fuel diffuses also increases, so a large value is set to the diffusion coefficient.

In a step S24, a displacement velocity equivalent value of the purge gas is computed from the dead time. This purge gas displacement velocity equivalent value is computed by inversing the dead time found in the step S22.

In a step S25, the purge correction coefficients FHOS stored in the data storage area (FIG. 8) of the controller 21, which corresponds to the distance between the purge valve 11 and cylinders of the engine 10, are read. In a step S26, the data is shifted to the cylinder side by an amount equivalent to the displacement velocity equivalent value of the purge gas. In a step S27, the average value of the data which has overflowed from the data storage area due to this shift is calculated.

In a step S28, diffusion processing is performed on the average value of the overflowed data calculated in the step S27 using the diffusion coefficient found in the step S22. This diffusion processing is generally diffusion processing using a first order lag, the degree of diffusion increasing the smaller the diffusion coefficient becomes.

Figure 8:
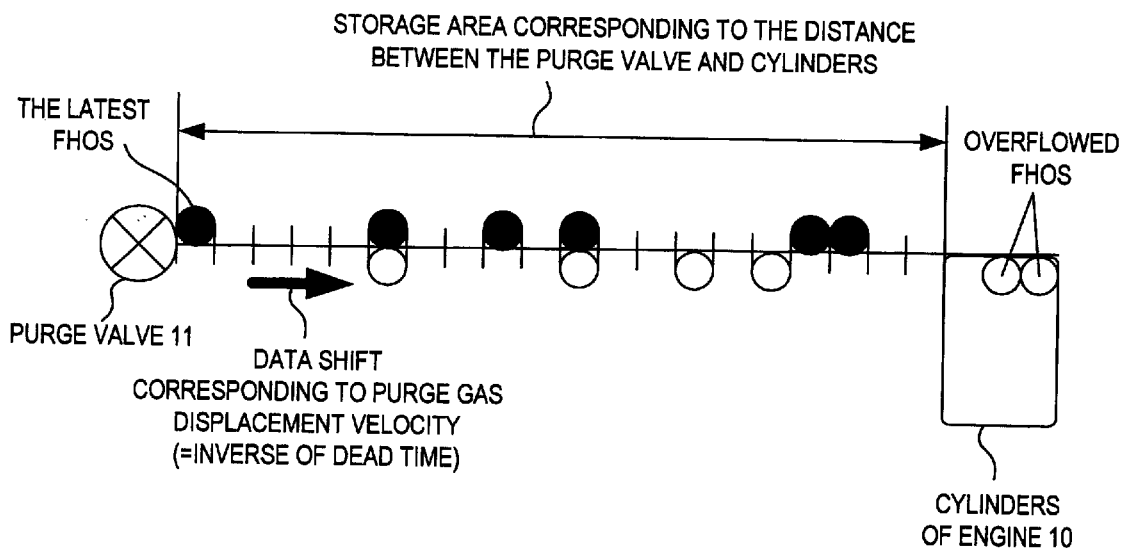
FIG. 8 is a diagram showing the concept of dead time processing in the delay correction.

FIG. 8 shows the concept of the dead time correction in the delay correction. In the figure, the black points show data before the data shift, and the white circles show data after the data shift.

As shown in FIG. 8, the data storage area corresponding to the distance from the purge valve 11 to the cylinders of the engine 10 is provided in the memory of the controller 21. The correction coefficient FHOS computed according to the fuel amount desorbed from the canister 4 is sequentially stored in the storage area. In the dead time correction, this data is shifted to the cylinder side by an amount corresponding to the displacement velocity of the purge gas (=inverse of dead time). The correction coefficients which have overflowed from the data storage area due to this data shift are regarded as correction coefficients corresponding to the purge gas which has reached and is supplied to the cylinders. By performing dead time processing by this data shift, the computed correction coefficients of the fuel pulse width can all be used for correction of fuel injection even if the dead time varies discontinuously. This avoids ignoring values and avoids the repeated use of certain values for fuel injection correction when the dead time varies. The value obtained by applying diffusion processing to the average value of this overflowed data is then used to correct a fuel injection pulse width Ti described later. In this way, the delay of the desorbed fuel in reaching the cylinder is reflected with high precision in the fuel injection amount correction by means of simple processing.

Returning now to FIG. 3, in a step S7, the fuel injection pulse width (drive pulse width of fuel injectors 15) Ti is computed. Specifically, a basic pulse width Tion is corrected by the air-fuel ratio feedback correction coefficient α and the purge correction coefficient FHOS, by the following equation (1) and the injection pulse width Ti of the fuel injectors 15 is computed.

$$Ti = Tion \times FHOS \times \alpha \times K + TB \quad (1)$$

where Tion=basic pulse width

FHOS=purge correction coefficient (value after delay correction)

α=air-fuel ratio feedback correction coefficient

K=fuel injector coefficient

TB=fuel injector ineffectual pulse width

The basic pulse width Tion is set according to the intake air flowrate and number of cylinders so as to realize the target air-fuel ratio. The air-fuel ratio feedback correction coefficient α is set to 100% (=1) when the target air-fuel ratio coincides with the air-fuel ratio detected by the oxygen sensor 18, is set to a smaller value than 100% when the detected air-fuel ratio is richer than the target air-fuel ratio, and is set to a larger value than 100% when the detected air-fuel ratio is leaner than the target air-fuel ratio. In this way, the fuel injection amount is corrected so that the actual air-fuel ratio approaches the target air-fuel ratio. The fuel injector coefficient K is the inverse of the ratio of the injector injection amount to the basic value for the same applied pulse time and the same differential pressure, and makes it possible to obtain the same fuel injection amount even using an injector having different injection characteristics. The fuel injector ineffectual pulse width TB corrects for the delay from when a drive voltage is applied to the fuel injectors 15 to open the valve, and fuel is actually injected.

Figure 9:
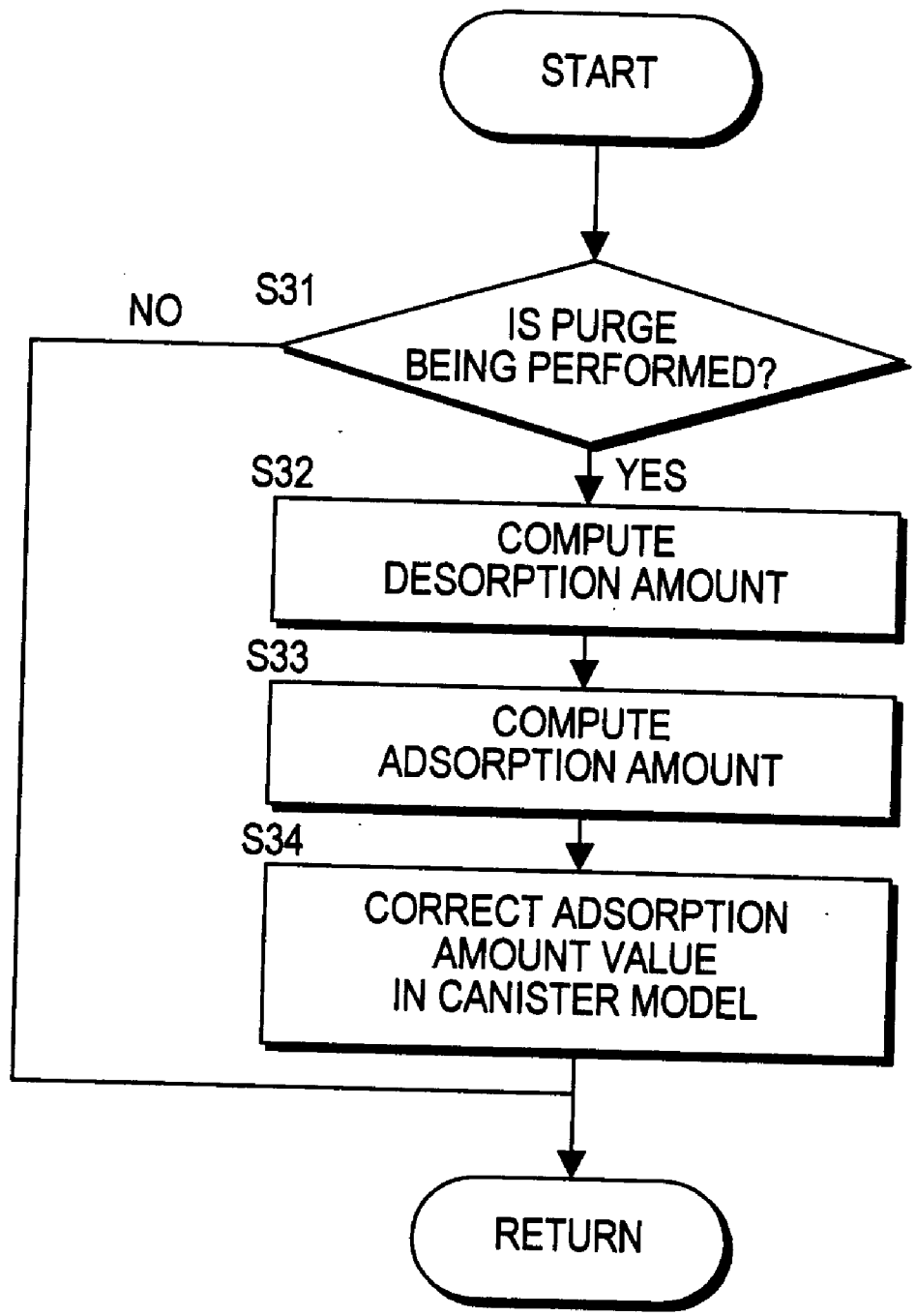
FIG. 9 is a flowchart showing the details of correction processing.

Next, the correction processing performed in the step S3 will be described in detail. FIG. 9 is a flowchart showing the details of this correction processing, and corresponds to the processing of the block B9 in FIG. 2.

First, it is determined in a step S31 whether purge is being performed. This is because the processing in steps S32, S33 assumes that purge is being performed, and if these processing are performed when purge is not being performed, an appropriate correction can no longer be made. When it is determined that purge is not being performed, the routine is terminated and correction processing is not performed.

When it is determined that purge is being performed, the routine proceeds to the step S32. In the step S32, the desorption amount (mass) is computed by the following equation (2) from the intake air weight found from the intake air flowrate and intake air temperature, purge rate, purge correction coefficient FHOS and air-fuel ratio feedback correction coefficient α:

$$Dg = K1 \times (1 - DLT + K2 \times PR) \times Qg \quad (2)$$

where Dg=desorption amount

DLT=total air-fuel ratio deviation (=(α×FHOS/100)−100%)

PR=purge rate

K1=coefficient (constant determined by properties of desorbed fuel)

K2=coefficient (constant determined by properties of air)

Qg=intake air weight

The coefficient K1 is a coefficient determined by the composition (average molecular weight) of the desorbed fuel, is found by experiment, and may be set to, for example, 15.2. The coefficient K2 is a coefficient determined by the average molecular weight, average density and average capacity per mole of air, is found by calculation, and may be set to, for example, 1.00672. Equation (2) is an equation for computing the fuel amount desorbed from the canister 4, from the deviation in the air-fuel ratio relative to the basic value (first term and second term on the right-hand side), the purge rate at that time (third term on the right-hand side) and the intake air weight In other words, it is considered that the deviation in the air-fuel ratio feedback correction coefficient α relative to the basic value is completely due to purge, and the desorption amount is estimated from the deviation of the air-fuel ratio.

In the step S33, an adsorption amount Yr (mass) of the canister 4 is computed by the following equation (3) from the desorption amount computed in the step S32 and purge flowrate:

$$Yr = KD \times Dg^{(1/n(T))} \quad (3)$$

where n(T)=desorption index

KD=desorption coefficient

T=activated carbon temperature

The desorption index n(T) is 2.56 when for example the activated carbon temperature is 20° C. The desorption coefficient KD is a coefficient to correct for the phenomenon that the desorption (or adsorption) occurs in proportion to the concentration difference, and is set so that the unit desorption characteristic of the canister (variation in total weight of canister relative to integrated purge amount) and the canister model output coincide. The unit desorption characteristic is found by experiment, and the desorption coefficient KD is found by calculation from the unit desorption characteristic. Equation (3) is an inverse computation to an equation (5) which is an equation of the canister model described later.

In a step S34, a value Y of the adsorption amount used to compute the desorption amount based on the canister model is replaced by the adsorption amount Yr computed in the step S33. In this way, the value of the adsorption amount used in the canister model can be corrected to a precise value, and the computational precision of subsequent desorption amounts can be improved.

Figure 10:
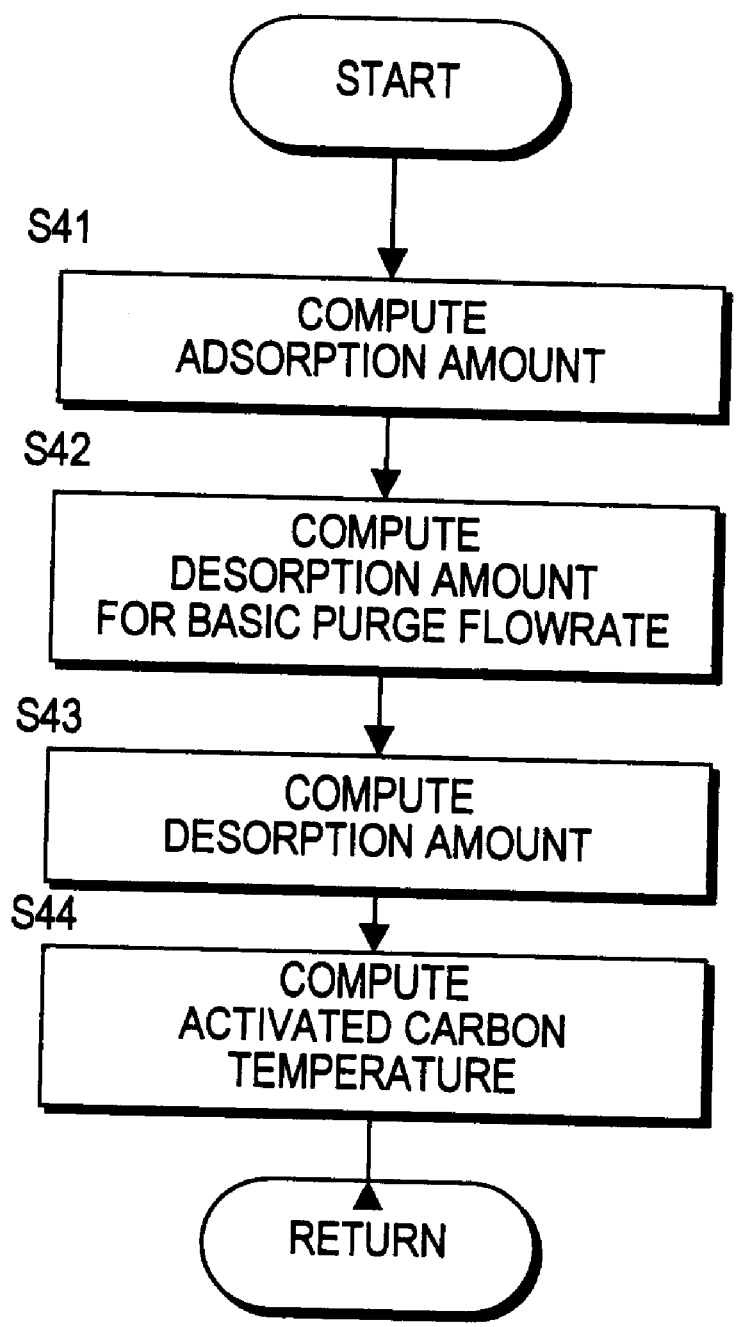
FIG. 10 is a flowchart showing the details of the computation of a fuel desorption amount based on a canister model.

The computation of the desorption amount based on the canister model in the step S4 of FIG. 3 will now be described referring to the flowchart shown in FIG. 10. This processing corresponds to the processing of the block B4 of FIG. 2.

Firstly, in a step S41, the current value Y of the fuel amount adsorbed by the canister 4 is computed by the following equation (4).

Adsorption Amount Computational Equation $$Y = Yz - Dgz \quad (4)$$

Yz=immediately preceding value of adsorption amount

Dgz=immediately preceding value of desorption amount

Equation (4) computes the current adsorption amount Y (mass) by subtracting the desorption amount Dgz on the immediately preceding occasion from the immediately preceding value Yz of the adsorption amount. However, when the correction processing shown in FIG. 9 is performed, the computation of equation (4) is not performed, or the value computed in equation (4) is ignored, and the adsorption amount Yr computed by correction processing in subsequent computations is used as the adsorption amount Y.

In a step S42, the desorption amount Dgk for the basic purge flowrate is computed by the following equation (5):

Desorption Amount Computation Equation for Basic Purge Flowrate $$Dgk = (Y/KD)\hat{\ }n(T) \qquad (5)$$

where Y=adsorption amount

KD=desorption constant n(T)=desorption index

T=activated carbon temperature

Equation (5) applies the concept of the adsorption/desorption phenomenon (Freundlich equation) to the canister desorption. Thus, the fuel desorption characteristic of the canister 4 can be suitably expressed. The Freundlich equation is given in "Theory of Surfaces II", edited by Tsukada (Maruzen, 1995), p.25–p.27, p.108–p.115.

In a step S43, the desorption amount is computed by the following equation (6):

Desorption Amount Computation Equation for Purge Flowrate $$Dg = k \times PQ \times Dgk \qquad (6)$$

k=constant

PQ=purge flowrate (=purge rate×intake air flowrate)

Dgk=desorption amount for basic flowrate.

Equation (6) is an equation which computes the desorption amount by a linear approximation from the fact that the purge flowrate and desorption amount are effectively in direct proportion. The constant k is the inverse of the basic purge flowrate. Here, the desorption amount for the basic flowrate is calculated by equation (5), and the desorption amount is computed by multiplying this by the purge flowrate in equation (6), but equation (5) and (6) may be combined into one equation.

In a step S44, the activated carbon temperature T is computed by the following equation (7):

Activated Carbon Temperature Computation Equation $$T = Tz - Kt1 \times (Yz2 - Yz) + Kt2 \times (Tz - Ta) \qquad (7)$$

Tz=immediately preceding value of activated carbon temperature

Kt1=heat absorption coefficient

Yz2=value of adsorption amount two occasions previously

Yz=immediately preceding value of adsorption amount

Kt2=heat transfer coefficient

Ta=canister atmosphere temperature

Equation (7) comprises a past temperature (first term on right-hand side), a temperature drop due to desorption (second term on right-hand side), and a temperature rise due to heat transfer (third term on right-hand side). The coefficient Kt1 is equal to the temperature drop of the activated carbon when 1 g of adsorbed material (fuel vapor) has desorbed from the adsorbent (activated carbon), and corrects for the temperature drop of the activated carbon due to desorption. The coefficient Kt2 is equal to the temperature rise of the activated carbon due to heat transfer when the temperature difference between the environment and the activated carbon is 1° C., and corrects for the temperature rise of the activated carbon due to heat transfer. The coefficients Kt1, Kt2 are found by experiment.

The reason why the activated carbon temperature T is computed, is because the desorption index n(T) in equation (5) is affected by the activated carbon temperature T and the desorption characteristics vary. In particular, when the desorption amount is large, the effect of computational error in the desorption amount on the air-fuel ratio fluctuation is large and high computational precision is required, but when the desorption amount is large, the drop in the activated carbon temperature Tis large, so the effect on the desorption characteristics of the fuel in the canister 4 can no longer be ignored.

Figure 11:
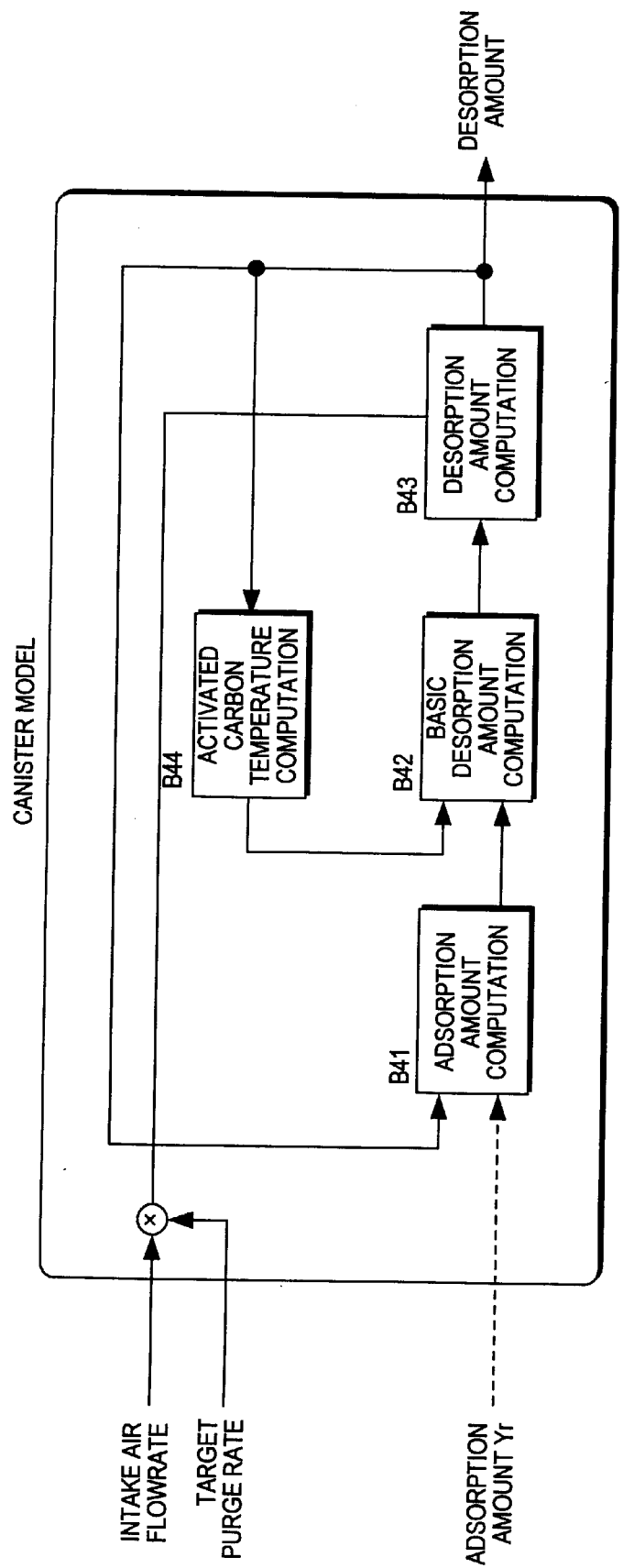
FIG. 11 is a block diagram showing the construction of the canister model.

The canister model comprises the above equations (4) to (7), and if equations (5) and (6) are combined, it comprises three equations. This may be shown graphically by FIG. 11. The canister model comprises a block B41 which computes the adsorption amount, a block B42 which computes the basic desorption amount, a block B43 which computes a desorption amount corresponding to the purge gas flowrate, and a block B44 which computes the activated carbon temperature. These blocks correspond respectively to equation (4) through (7).

Next, the setting of the target purge rate will be described.

Figure 12:
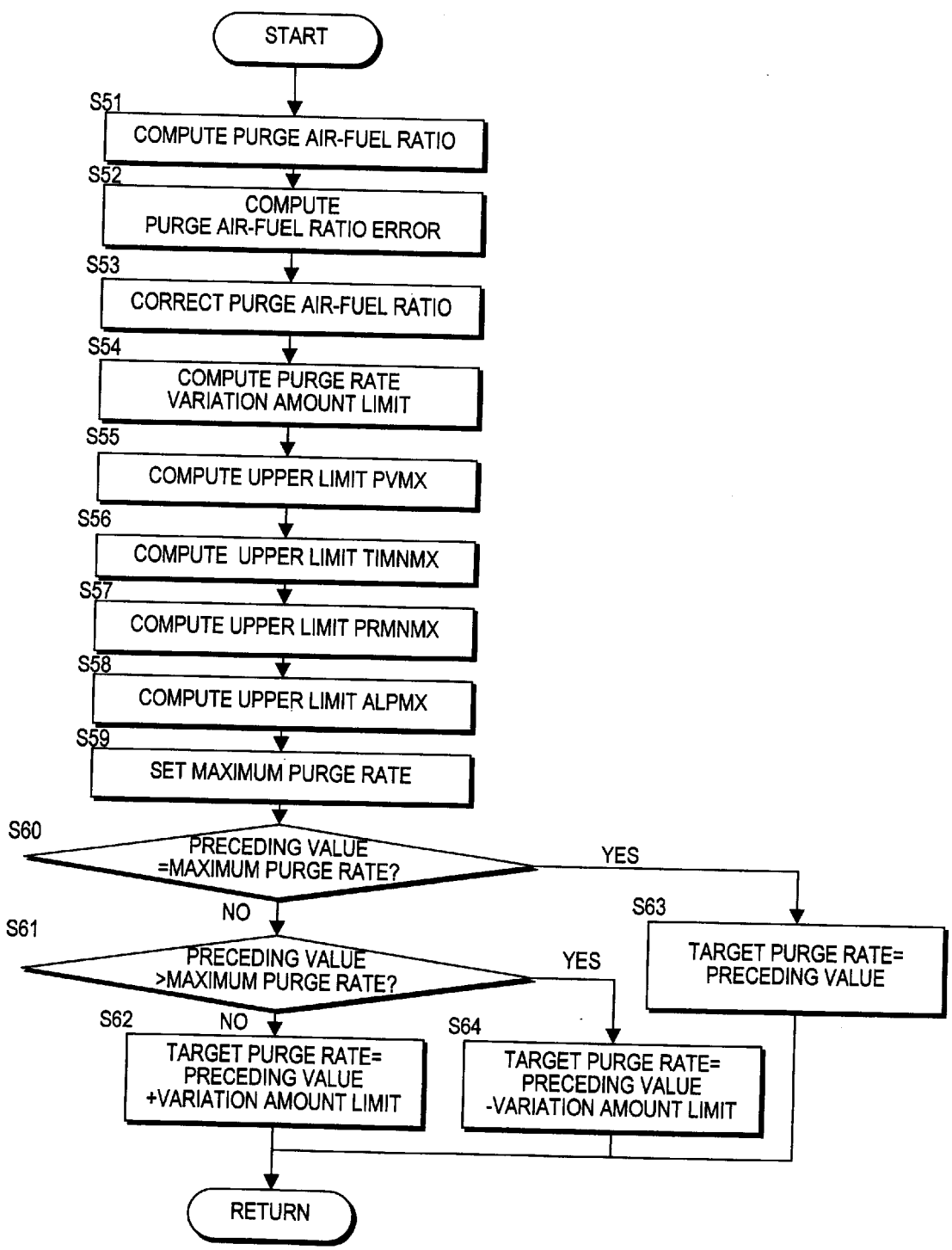
FIG. 12 is a flowchart showing the details of a target purge rate setting.

FIG. 12 is a flowchart showing the setting of the target purge rate. This corresponds to the processing of the block B5 in FIG. 2. The purge valve 11 is driven at a duty ratio such that the target purge rate set by this processing is achieved.

First, in a step S51, the air-fuel ratio (purge air-fuel ratio) of the purge gas, is computed based on the desorption amount computed based on the canister model and purge flowrate. In this embodiment, the purge air-fuel ratio is computed based on the desorption amount computed according to the canister model, so the purge air-fuel ratio can be computed economically and precisely. The purge air-fuel ratio may be detected by an HC sensor.

Figure 13:
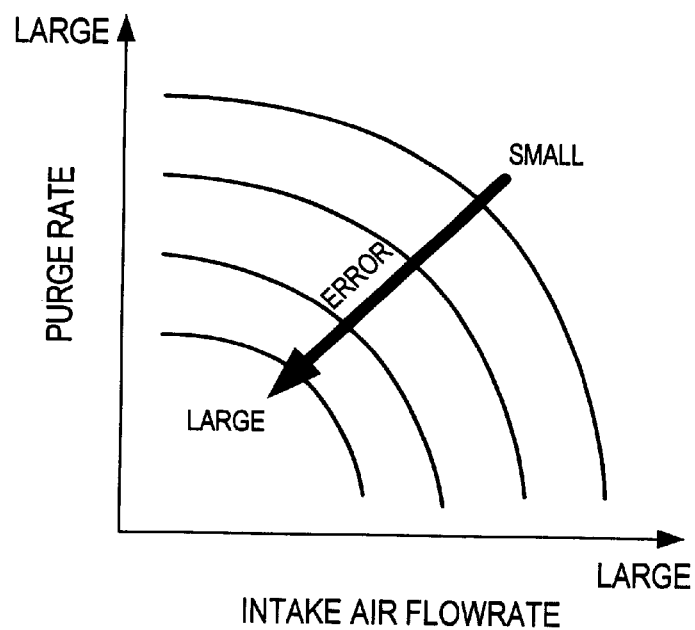
FIG. 13 is a map specifying a relation of a purge air-fuel ratio error relative to intake air flowrate and purge rate.
Figure 14:
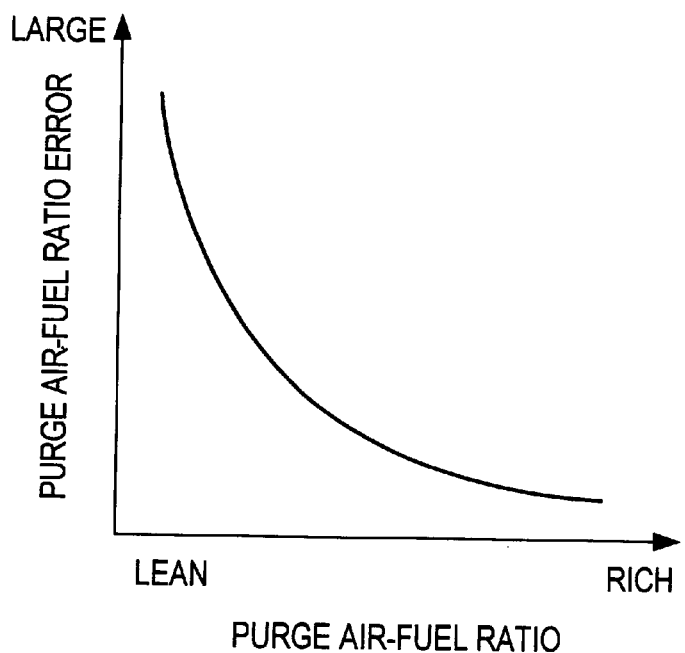
FIG. 14 is a table specifying a relation of the purge air-fuel ratio error to the purge air-fuel ratio.

In a step S52, the error in the purge air-fuel ratio is estimated from running conditions, for example, from parameters such as the engine rotation speed, engine load and intake air flowrate. The estimation of the purge air-fuel ratio error is for example performed by looking up the table shown in FIG. 13, the purge air-fuel ratio error increasing as the intake air flowrate decreases or the purge rate decreases. Alternatively, the purge air-fuel ratio error may be found by looking up a table specifying the relation between the purge air-fuel ratio and the purge air-fuel ratio error, as shown in FIG. 14. When the purge air-fuel ratio error has been found, the routine proceeds to a step S53, and the purge air-fuel ratio calculated in the step S51 is corrected based on this error.

In a step S54, a purge rate variation amount limit is computed based on the purge air-fuel ratio after error correction. When the purge rate varies, the air-fuel ratio of the engine 10 varies, and the purge rate variation amount limit is computed so that the air-fuel ratio fluctuation of the engine 10 is kept within a tolerance width. The tolerance width of the air-fuel ratio fluctuation is set to a width at which it can be absorbed by performing air-fuel ratio feedback control which does not increase exhaust emissions.

In a step S55, a purge rate upper limit PVMX specified by the size of the purge valve 11 is computed. The reason for calculating the purge rate upper limit PVMX is that, if the target purge rate is set larger than the purge rate obtained at the maximum opening of the purge valve 11, the actual purge rate and target purge rate no longer coincide, the error in the computation of FHOS increases so that the air-fuel ratio fluctuation increases, and emissions increase. Specifically, if the purge valve size is constant, the purge gas flowrate through the valve increases the larger the differential pressure on either side of the purge valve, so a large value is computed as the upper limit PVMX when the differential pressure on either side of the purge valve is large.

In a step S56, a purge rate upper limit TIMNMX based on the characteristics of the injectors 15 is computed from the relation between the minimum fuel injection pulse width determined according to the characteristics of the fuel injectors 15, the immediately preceding value of the target purge rate and the purge correction coefficient. When the purge rate increases, the fuel amount supplied to the engine 10 increases due to purge, and the fuel injection pulse width is corrected to be shorter so as to decrease the fuel injection amount from the fuel injectors 15 correspondingly. However, to maintain the injection precision of the fuel injectors 15, the injection pulse width must be larger than the predetermined minimum pulse width. In other words, to make the fuel injection pulse width larger than the minimum pulse width, the purge rate must be smaller than a certain value. Due to this reason, the upper limit of the purge rate is specified by the injection characteristics of the fuel injector 15.

In a step S57, assuming all possible running regions that could be reached from the present running region, the minimum purge rate from among these is predicted, and a purge rate upper limit PRMNMX is computed from this minimum purge rate and the purge rate variation amount limit. When for example the vehicle is accelerated by depressing the accelerator pedal to the maximum, the target purge rate is set to a very small value, but if the target purge rate is set to a large value immediately before the accelerator pedal depression is a maximum, the variation amount of the purge rate is limited to below the variation amount limiting value, so the purge rate can no longer follow the target purge rate. This tracking delay increases emissions, so the purge rate upper limit is specified also from the minimum possible purge rate so that this tracking delay does not occur.

In a step S58, the air-fuel ratio feedback correction coefficient a is monitored, and if it does not exceed a predetermined value (e.g., 80%), the largest value of the purge rate which makes the air-fuel ratio feedback correction coefficient α higher than the predetermined value, is computed as a purge rate upper limit ALPMX. The reason why this upper limit ALPMX is provided is that, under fuel ratio feedback control, although the air-fuel ratio feedback correction coefficient α is controlled to be within 100+25%, if the air-fuel ratio feedback correction coefficient α is controlled under the predetermined value and a large amount of purge is performed, the air-fuel ratio is subject to disturbances other than purge and tends to leave the above control range, so in such a case, it is necessary to make the air-fuel ratio feedback correction coefficient a larger than the predetermined value immediately.

In a step S59, the smallest value of the above upper limits PVMX, TIMNMX, PRMNMX, ALPMX is selected, and this value is set to the maximum purge rate.

In steps S60, S61, the immediately preceding value of the target purge rate is compared with the maximum purge rate. When the immediately preceding value of the target purge rate is equal to the maximum purge rate, the target purge rate is left at the immediately preceding value (step S63), when the immediately preceding value of the target purge rate is larger than the maximum purge rate, the target purge rate is set to a value obtained by subtracting the purge rate variation amount limit from the immediately preceding value (step S64), and when the immediately preceding value of the target purge rate is less than the maximum purge rate, the target purge rate is set to a value obtained by adding the purge rate variation amount limit to the immediately preceding value (step S62).

Therefore, the target purge rate is set to follow the maximum purge rate within the limits of the purge rate variation amount limit, and the optimum purge rate which can achieve the maximum purge without increasing exhaust gas emissions is set. When the maximum purge rate is set, not only the upper limits PVMX, TIMNMX, ALPMX determined by physical constraints, but also the upper limit PRMNMX determined so that a shift to the maximum purge rate can be performed without delay even if the running region changes, are taken into consideration. Hence, the optimum purge rate can be set to perform the maximum amount of purge without increasing exhaust gas emissions even if the running conditions change.

The processing of the aforesaid canister model cannot be performed when correction processing has not yet been performed and there is no initial value (initial adsorption amount) used by the canister model. However, to achieve a large amount of purge, purge must be performed even before the above correction processing. Thus, a purge rate is set by the boot-up control shown in FIG. 15 instead of the above processing until correction processing is performed, and purge is performed at the set purge rate. In boot-up control, the air-fuel ratio fluctuation due to the purge is absorbed by air-fuel ratio feedback control, and the fuel injection amount is not corrected.

The processing shown in FIG. 15 will now be described. First, in a step S71, the integrated purge flowrate (total purge flowrate from the start of purge) is compared with the volumetric capacity of the pipe 6 (precisely, the volumetric capacity of the pipe 6 from the canister 4 to the purge valve 11). When the integrated purge flowrate exceeds the purge pipe volumetric capacity, the routine proceeds to a step S72, and when it does not exceed the purge pipe volumetric capacity, the routine proceeds to a step S75.

In the step S75, the target purge rate is set to an initial purge rate. The initial purge rate is a small value less than 1%. The reason why the initial purge rate is set to such a small value is that, if the integrated purge flowrate does not reach the purge pipe volumetric capacity, although the gas in the purge pipe is supplied to the engine 10 before purge starts, the air-fuel ratio of the gas in this purge pipe is unknown, and there is a possibility that if the target purge rate setting shown in the step S72 and subsequent steps were performed, the combustion stability of the engine 10 would be impaired.

In other words, if low concentration purge gas present in the pipe is supplied when purge starts and the air-fuel ratio fluctuation due to this is small, it is determined that a large amount of purge could be performed and a large purge rate is set. If a large purge rate is set in this way, all the low concentration gas in the pipe would be supplied, and when the high concentration purge gas which was originally intended is supplied, a large amount of desorbed fuel would suddenly be supplied which would lead to an impairment of the combustion stability of the engine 10.

When the integrated purge flowrate exceeds the pipe volumetric capacity, the routine proceeds to a step S72, and the difference between the actual air-fuel ratio feed back deviation and target air-fuel ratio feedback deviation is computed. The target air-fuel ratio feedback deviation is the deviation between a target value tα of the air-fuel ratio feedback correction coefficient and the basic value (100%) of the air-fuel ratio feedback correction coefficient (=|tα−100%|). The actual air-fuel ratio feedback deviation is the deviation between the actual air-fuel ratio feedback correction coefficient α and the basic value of the air-fuel ratio feedback correction coefficient (=α−100%).

For example, if the target value of the air-fuel ratio feedback correction coefficient α is set to 80% in order to maintain the air-fuel ratio fluctuation due to purge within a range in which it can be fully absorbed by air-fuel ratio feedback control, the target air-fuel ratio feedback deviation is set to 20%.

Figure 16:
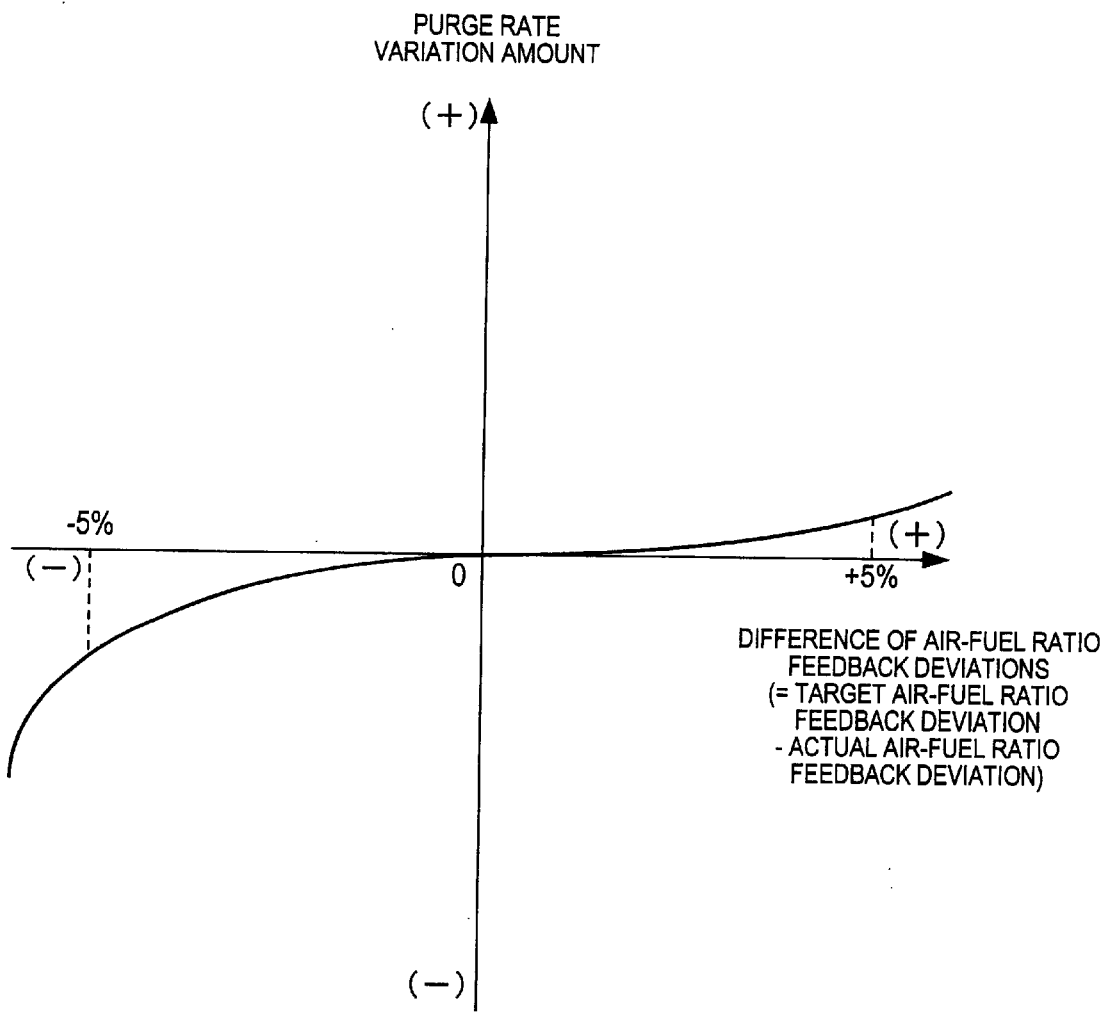
FIG. 16 is a table specifying the relation between a difference of air-fuel ratio feedback deviations (=target air-fuel ratio feedback deviation—actual air-fuel feedback deviation), and purge rate variation amount.

In a step S73, a purge rate variation amount is calculated according to the difference between the target air-fuel ratio feedback deviation and actual air-fuel ratio feedback deviation by looking up a table shown in FIG. 16. The purge rate variation amount is set to a value which becomes larger, the larger the absolute value of the difference between the target air-fuel ratio feedback deviation and actual air-fuel ratio feedback deviation, so that convergence to the target value is enhanced. Also, different values are set depending on the sign of the difference between the target air-fuel ratio feedback deviation and actual air-fuel ratio feedback deviation, even if the absolute value of the difference is the same. The purge variation amount is set to a large value (absolute value) when the difference between the air-fuel ratio feedback deviations shifts to the negative side.

The reason why different characteristics are set to the purge variation amount depending on the sign of difference between the air-fuel ratio feedback deviations, is that when the difference between the air-fuel ratio feedback deviations shifts to the negative side, the air-fuel ratio feedback correction coefficient α takes a smaller value than the target 80%, and compared to the case where it is shifted to the positive side, it is a disadvantageous state wherein the engine stability is adversely affected by disturbances other than purge and emissions tend to increase.

In other words, the reason for changing the characteristics of the purge variation amount depending on the difference between the air-fuel ratio feedback deviations is to rapidly return the control point to the safe side from the viewpoint of engine combustion stability and preventing emission increase.

After computing the purge variation amount as described above, the routine proceeds to a step S74, and the purge variation amount computed in the step S73 is added to the target purge rate computed on the immediately preceding occasion this routine was executed, so as to compute a new target purge rate. In a step S76, the purge flowrate is calculated from the target purge rate and intake air flowrate, and the value of the integrated purge flowrate is updated.

Therefore, according to this processing, the optimum purge rate can be set regardless of the adsorption state of the canister 4. Even if a purge of higher concentration than that envisaged is supplied, the target purge rate is suitably updated according to the air-fuel ratio fluctuation due to this and the optimum purge rate is always set.

Figure 15:
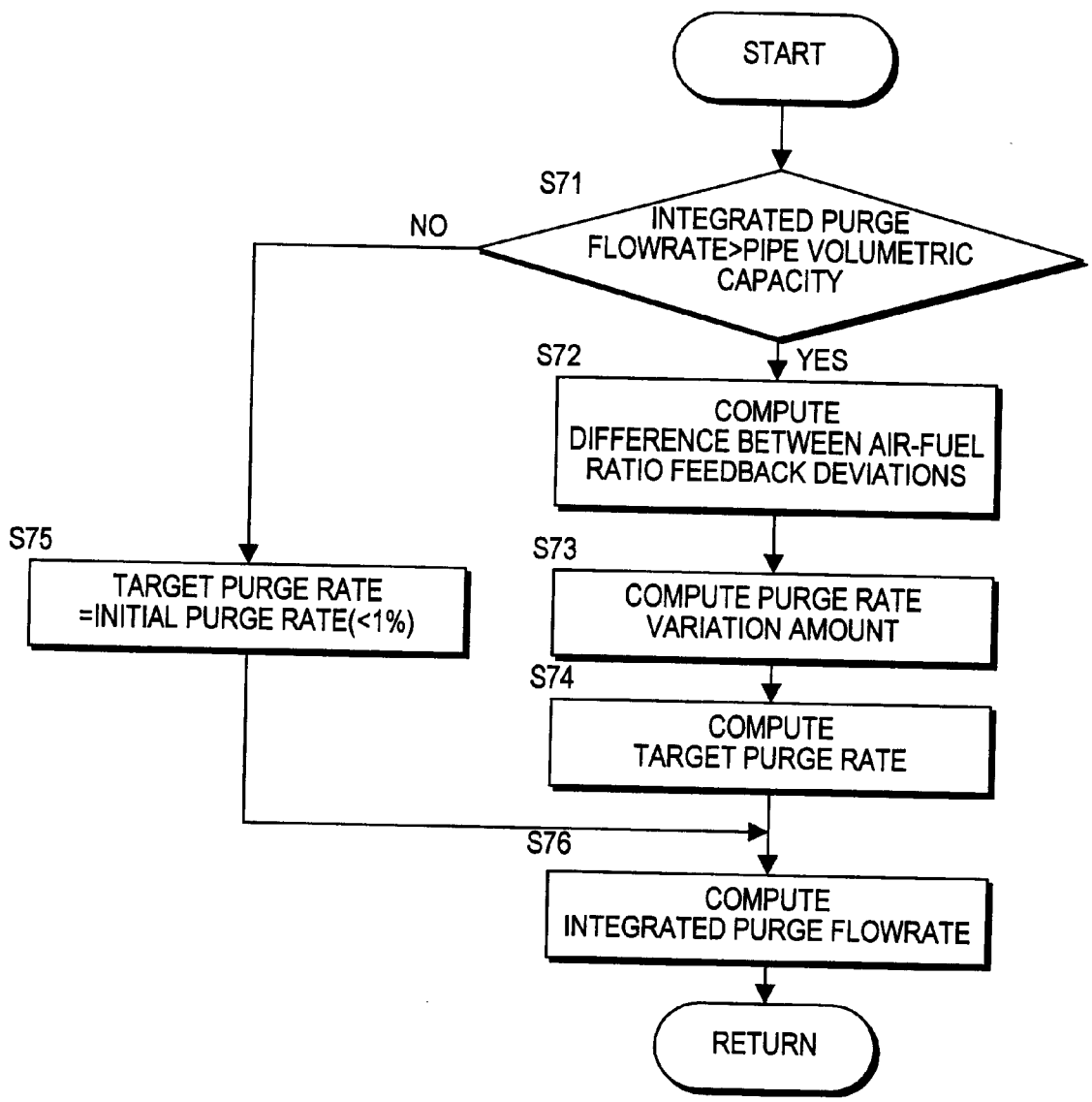
FIG. 15 is a flowchart showing a target purge rate setting processing until the canister model starts up.

In this embodiment, the processing shown in FIG. 15 is performed until the initial value of the canister model is computed by correction processing. After correction processing is performed, purge is performed based on the canister model, but purge may also be performed at any time by the processing shown in FIG. 15.

Next, the overall operation according to the above control will be described.

In the fuel vapor processing device according to this invention, during purge, the target purge rate is set to as large a value as possible to the extent that the engine combustion stability does not decrease and emissions do not increase, and the purge valve 11 is driven to achieve the target purge rate. During purge, purge gas containing fuel which has desorbed from the canister 4 is supplied to the engine 10, so the controller 21 predicts the air-fuel ratio fluctuation of the engine 10 due to the supplied fuel resulting from purge by estimating the fuel amount desorbed from the canister 4, and corrects the fuel injection pulse width applied to the fuel injectors 15 so as to suppress this air-fuel ratio fluctuation.

The desorbed fuel amount from the canister 4 is precisely estimated in a short time using the canister model represented by equation (4) to equation (7). Due to the canister model, if the specifications of the canister are known, it is only necessary to change the parameters of the model if the vehicle type or canister used is changed, and it is not necessary to reconstruct the maps and tables.

The canister model is an approximate model, and as the desorption amount computed based on the model contains some errors, these errors accumulate as the operating time of the model becomes longer. For this reason, the controller 21 estimates the fuel amount desorbed from the canister 4 from the variation of the air-fuel ratio feedback correction coefficient α, and corrects the value of the adsorption amount which is an internal parameter of the canister model using an adsorption amount obtained by inverse computation from the estimated desorption amount. The correction processing does not require any special sequence to be performed, and it is unnecessary to reduce the purge rate to perform the correction. Also, the correction processing is performed when it is considered that disturbances of the air-fuel ratio other than purge are small and the air-fuel ratio fluctuation (variation of air-fuel ratio feedback coefficient α) is almost entirely due to purge and the effect of purge on the air-fuel ratio is relatively large, so a high correction precision may be expected.

There is a delay from when the purge valve 11 is opened to when the desorbed fuel reaches the cylinders of the engine 10, and as the fuel also diffuses before it reaches the cylinders, the correction of fuel injection pulse width is performed taking this delay and diffusion into account.

Further, the purge control which uses the aforesaid canister model cannot be implemented until the initial value of the adsorption amount is calculated by correction processing, but until the initial value of the canister model is computed, the target purge rate is set according to the difference between the target air-fuel ratio feedback deviation and the actual air-fuel ratio feedback deviation, and the purge valve 11 is driven so that this target purge rate is achieved. In this way, purge can be performed even before the initial value is computed by correction processing, and an effective purge can be performed in all running regions.

The entire contents of Japanese Patent Applications P2001-71562 (filed Mar. 14, 2001) and P2001-71564 (filed Mar. 14, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A fuel vapor emission control device of an engine which is air-fuel ratio feedback controlled, comprising:

a canister which adsorbs fuel vapor generated in a fuel tank of the engine, a purge passage which connects the canister and an intake passage of the engine, a purge valve which opens and closes the purge passage, and a controller functioning to:
- compute a target air-fuel ratio feedback deviation, which is the deviation between a target value of the air-fuel ratio feedback correction coefficient and a basic value of the air-fuel ratio feedback correction coefficient,
- compute an actual air-fuel ratio feedback deviation which is the deviation between an actual air-fuel ratio feedback correction coefficient and the basic value of the air-fuel ratio feedback correction coefficient,
- set a target purge rate according to the difference between the target air-fuel ratio feedback deviation and the actual air-fuel ratio feedback deviation, and
- drive the purge valve so that the purge rate becomes the target purge rate.

2. The fuel vapor emission control device as defined in claim 1, wherein the controller further functions to:
- set a larger target purge rate variation amount, the larger the difference between the target air-fuel ratio feedback deviation and the actual air-fuel ratio feedback deviation becomes, and
- set the target purge rate by adding the target purge rate variation amount to the immediately preceding value of the target purge rate.

3. The fuel vapor emission control device as defined in claim 2, wherein the controller further functions to:
- set a different value to the target purge rate variation amount depending on whether the difference between the deviations is positive or negative, even when the magnitude of the difference between the deviations is identical.

4. The fuel vapor emission control device as defined in claim 1, wherein the controller further functions to:
- perform purge by filing the value of the purge rate to less than 1 percent until the gas between the canister and the purge valve is purged.

5. The fuel vapor emission control device as defined in claim 1, wherein the controller further functions to:
- compute an initial value of the fuel amount adsorbed by the canister, and
- when the initial value of the adsorbed fuel amount has computed,
  - drive the purge valve so that the purge rate becomes the target purge rate, compute a fuel injection pulse width so that the air-fuel ratio of the engine is a target air-fuel ratio,
  - compute the fuel amount desorbed from the canister using a canister model,
  - correct the fuel injection pulse width based on the computed desorbed fuel amount such that the air-fuel ratio fluctuation of the engine due to performing purge at the target purge rate is reduced, and
  - drive a fuel injector of the engine at the fuel injection pulse width after correction, and
- the canister model comprises:
  - an equation which computes the fuel amount adsorbed by the canister based on the immediately preceding value of the fuel amount adsorbed by the canister and the immediately preceding value of the fuel amount desorbed from the canister, and
  - an equation which computes the fuel amount desorbed from the canister based on the computed adsorbed amount and the target purge rate.

6. The fuel vapor emission control device as defined in claim 5, wherein the controller further functions to:
- estimate the fuel amount desorbed from the canister by considering that the air-fuel ratio fluctuation of the engine is due to purge, and
- compute the initial value of the adsorbed fuel amount by inverse computation from the estimated desorbed amount.

7. A fuel vapor emission control device of an engine which is air-fuel ratio feedback controlled, comprising:
- a canister which adsorbs fuel vapor generated in a fuel tank of the engine,
- a purge passage which connects the canister and an intake passage of the engine,
- a purge valve which opens and closes the purge passage,
- means for computing a target air-fuel ratio feedback deviation, which is the deviation between a target value of the air-fuel ratio feedback correction coefficient and a basic value of the air-fuel ratio feedback correction coefficient,
- means for computing an actual air-fuel ratio feedback deviation which is the deviation between an actual air-fuel ratio feedback correction coefficient and the basic value of the air-fuel ratio feedback correction coefficient,
- means for setting a target purge rate according to the difference between the target air-fuel ratio feedback deviation and the actual air-fuel ratio feedback deviation, and
- means for driving the purge valve so that the purge rate becomes the target purge rate.

* * * * *

UNITED STATES PATENT AND TRADEMARK OFFICE
CERTIFICATE OF CORRECTION

PATENT NO. : 6,453,887 B1
DATED : September 24, 2002
INVENTOR(S) : Takane Hayashi et al.

It is certified that error appears in the above-identified patent and that said Letters Patent is hereby corrected as shown below:

This certificate supersedes Certificate of Correction issued February 11, 2003, the number was erroneously mentioned and should be vacated since no Certificate of Correction was granted.

Signed and Sealed this

Twenty-second Day of April, 2003

JAMES E. ROGAN
*Director of the United States Patent and Trademark Office*